United States Patent
Zhuang et al.

(10) Patent No.: US 6,750,940 B2
(45) Date of Patent: Jun. 15, 2004

(54) LIQUID CRYSTAL BASED OPTICAL SWITCH UTILIZING DIFFRACTION

(75) Inventors: Songlin Zhuang, Shanghai (CN);
Lingjuan Gu, Shanghai (CN);
Yinggang Qiu, Shanghai (CN)

(73) Assignee: Bao Tong International Telecommunication Holdings Limited, Road Town (VG)

( * ) Notice: Subject to any disclaimer, the term of this patent is extended or adjusted under 35 U.S.C. 154(b) by 0 days.

(21) Appl. No.: 09/963,939

(22) Filed: Sep. 26, 2001

(65) Prior Publication Data

US 2003/0058400 A1 Mar. 27, 2003

(51) Int. Cl.⁷ .................................................. G02F 1/13
(52) U.S. Cl. ........................................ 349/196; 349/201
(58) Field of Search ............................ 349/86, 87, 96, 349/196, 201

(56) References Cited

U.S. PATENT DOCUMENTS

| | | | | |
|---|---|---|---|---|
| 5,748,272 A | * | 5/1998 | Tanaka et al. | 349/86 |
| 6,111,633 A | * | 8/2000 | Albert et al. | 349/196 |
| 2001/0033400 A1 | * | 10/2001 | Sutherland et al. | 359/15 |
| 2002/0097355 A1 | * | 7/2002 | Kralik et al. | 349/86 |
| 2002/0130988 A1 | * | 9/2002 | Crawford et al. | 349/86 |

OTHER PUBLICATIONS

"Performance of photonic switching systems based on electro-optic volume holographic diffraction gratings", Stone et al., SPIE 4112, 38–47 (2000).*

* cited by examiner

Primary Examiner—T. Chowdhury
(74) Attorney, Agent, or Firm—Robert K. Tendler

(57) ABSTRACT

An optical switch is provided in which a cell comprised of photopolymer dispersed in a liquid crystal sandwiched between two transparent plates is first recorded with a grating utilizing two plane wave laser beams interacting at an angle. This grating is permanently established in the cell such that when the cell is illuminated the incoming beam is diffracted in accordance with the spatial frequency of the grating. When an electric signal is applied across the cell, the refractive index of the liquid crystal matches that of the photopolymer due to the molecular orientation of the liquid crystal and no diffraction occurs because the grating formed in the liquid crystal is temporarily erased or over written. The liquid crystal cell therefore becomes transparent with the application of the electrical signal. Switching occurs by whether or not the grating is present or not, which is in turn dependent upon whether or not there is an electrical signal applied across the cell.

7 Claims, 4 Drawing Sheets

LIQUID CRYSTAL BASED OPTICAL SWITCH UTILIZING DIFFRACTION

FIELD OF INVENTION

This invention relates to optical switches and more particularly to an optical switch involving a photopolymer dispersed within a liquid crystal layer.

BACKGROUND OF THE INVENTION

As discussed in U.S. Pat. No. 6,111,633 issued to Richard Albert et al there exist liquid crystal based optical switches which do not require polarization techniques in order to switch an incoming light beam from one position to another or in fact to switch it on and off. Optical switches have long been known of the mechanical variety and are used principally in telecommunication transmission systems. The reason for the growth in the development of optical switches centers around the use of optical fibers which can accommodate broad bandwidth signals and hence can convey larger quantities of information. Moreover, light waves used in optical fibers have shorter wavelengths than conventional microwaves and are commonly used in telecommunications systems. As opposed to microwaves, the use of optical fibers and their attendant components result in a dramatic reduction in physical size of the cable plant or switching network. It will be appreciated that optical fibers exhibit little or no electromagnetic or radio frequency radiation and thus result in negligible environmental impact. Moreover, optical fibers are relatively insensitive to electromagnetic and radio frequency interference from the surrounding environment.

While every telecommunications system must include means for switching or redirecting the optical signal, the mechanical switches require relatively high driving power and are subject to wear, abrasion and fatigue. As a result, mechanical switches are prone to failure after repeated use. More importantly, since the optical fibers are relatively small, a small displacement in alignment between the output port fibers or input port fibers can easily cause the mechanical switch to fail. This requires mechanical switches which are expensive due to the small tolerances which are required.

As mentioned in the aforementioned patent, liquid crystal optical switches have been proposed as an alternative to the mechanical variety of optical switches. Typical of such liquid crystal optical switches are those described in U.S. Pat. Nos. 4,792,212; 4,790,633 and 4,813,796 issued to Baker. As mentioned in the aforementioned patent, all of these Baker switches utilize some form of polarization in order to do the switching.

On the other hand, the aforementioned optical switch by Richard Albert et al is one which operates by changing the orientation of the optical axis of the liquid crystal such that the optical axis is either perpendicular to the longitudinal plane of liquid crystal or is aligned parallel to the direction of propagation of the light signal. A light signal meeting the optical axis in an alignment perpendicular to the liquid crystal layer is totally reflected, whereas light traveling parallel to the optical axis passes through the liquid crystal layer. Applying an electric field across the liquid crystal layer changes the orientation of the optical axis from perpendicular to parallel. Thus depending on the application of electrical signal, the light is either reflected or passes through so as to effectuate the switching.

While the Albert et al patent overcomes the necessity for the utilization of polarizing apparatus in polarized light, there appears to be a relatively high insertion loss during the switching process due to the complete reflectivity due to the change in orientation of the optical axis. Moreover, the orientation of the input beam relative to the optical axis is critical in the switches such that if there is any misalignment the switching is deleteriously affected.

Moreover, the switches associated with the Albert et al patent are somewhat larger and more cumbersome than they need to be due to the alignment tolerances which must be maintained.

SUMMARY OF THE INVENTION

Rather than utilizing mechanical optical switches, and rather than utilizing either polarization dependent or polarization independent liquid crystal switching devices, in the subject system a photopolymer is dispersed in a liquid crystal used in a cell bounded by transparent electrodes and is patterned through the utilization of interfering laser beams to provide a diffraction grating within the cell. In one embodiment the photopolymer dispersed liquid crystal material is five microns in thickness, with the spatial frequency of the grating depending upon the angle between the two interfering beams, as well as depending upon the frequency of the monochromatic radiation utilized in generating the diffraction pattern. The diffraction pattern is recorded and imprinted into the cell due to the utilization of the photopolymer which serves as an erasable record of the grating, and one which can be overwritten.

It has been found that by the application of an electric signal across the liquid crystal layer, the grating can be made to effectively disappear during the application of the electric field. The response of the switch has been found to be less than five microseconds and the grating erasure is due the fact that when the electrical signal is applied the refractive index of the liquid crystal is matched to that of the photopolymer due to the molecular orientation of the liquid crystal. As a result, there is no diffraction associated and the diffraction grating in essence disappears during the application of the electrical signal.

While the subject invention will be described in terms of diffraction gratings, it will be appreciated that other types of interference fringes can be established by laser-writing holography and computer-generated holography to create a device with tailored properties. Thus, for instance, rather than interfering two plane waves which results in the diffraction grating, the subject invention also includes a plane wave interacted with a divergent spherical wave to result in a positive lens. Again, when the electrical signal is applied to the cell, the light which is ordinarily converged to a certain focus by the interference fringe is now defocused.

The result is a switching device with extremely fast response speed which can be lower than five microseconds, is compact and smaller in size due to the noncriticality of the alignment of the incoming beam and the outgoing beam. It is both cost effective and has a long lifetime due to the fact of there being no moving parts and the inherent long lifetime of a liquid crystal.

The switches are easy to arrange in a matrixed optical switch and the power consumption is in fact quite low. Most importantly since reflection is not employed in the subject switch, insertion losses are less than those devices which employ reflection.

In one embodiment, the cell which is sandwiched between two glass plates and in between two conductive coatings on the plates includes a photopolymer, liquid crystal, a dye, acrylate oligomer and acrylated urothane.

In order to make a polymer dispersed liquid crystal cell, as a first step an ITO glass cell is provided having two glass plates. One glass plate is first coated with itrium tantalum oxide (ITO) on one side of the glass plate. Then a droplet of the polymer dispersed liquid crystal, is placed on the ITO coating. Subsequently, a second ITO coated glass plate, with ITO facing the polymer dispersed liquid crystal is placed over the droplet. The two plates are pressed together to make the polymer dispersed liquid crystal droplet spread symmetrically. In order to control the thickness of the liquid crystal film, a spacer is used to achieve a thickness of about 3–15 microns.

The utilization of the dispersed photopolymer permits the imprinting or recording into the optical switch of the desired grating or infringe pattern. It will be appreciated that the amount by which the incoming light is diverted off axis depends on the spatial frequency of the grating or the spatial frequency of the interference fringe lines. This is readily controllable such that optical switches having cells of differing densities of lines and thus different spatial frequencies may be utilized to provide differing degrees of offsetting of the incoming beam, which, when cascaded together can provide that the output beam be directed to one of two, one of four or one of n discreet locations, thus to convey differing bits of information.

In summary, an optical switch is provided in which a cell comprised of photopolymer dispersed in a liquid crystal sandwiched between two transparent plates is first recorded with a grating utilizing two plane wave laser beams interacting at an angle. This grating is permanently established in the cell such that when the cell is illuminated the incoming beam is diffracted in accordance with the spatial frequency of the grating. When an electric signal is applied across the cell, the refractive index of the liquid crystal matches that of the photopolymer due to the molecular orientation of the liquid crystal and no diffraction occurs because the grating formed in the liquid crystal is temporarily erased or over written. The liquid crystal cell therefore becomes transparent with the application of the electrical signal. Switching occurs by whether or not the grating is present or not, which is in turn dependent upon whether or not there is an electrical signal applied across the cell.

BRIEF DESCRIPTION OF THE DRAWINGS

These and other features of the subject invention will be better understood in connection with the Detailed Description in conjunction with the Drawings of which.

DETAILED DESCRIPTION

Figure 1:
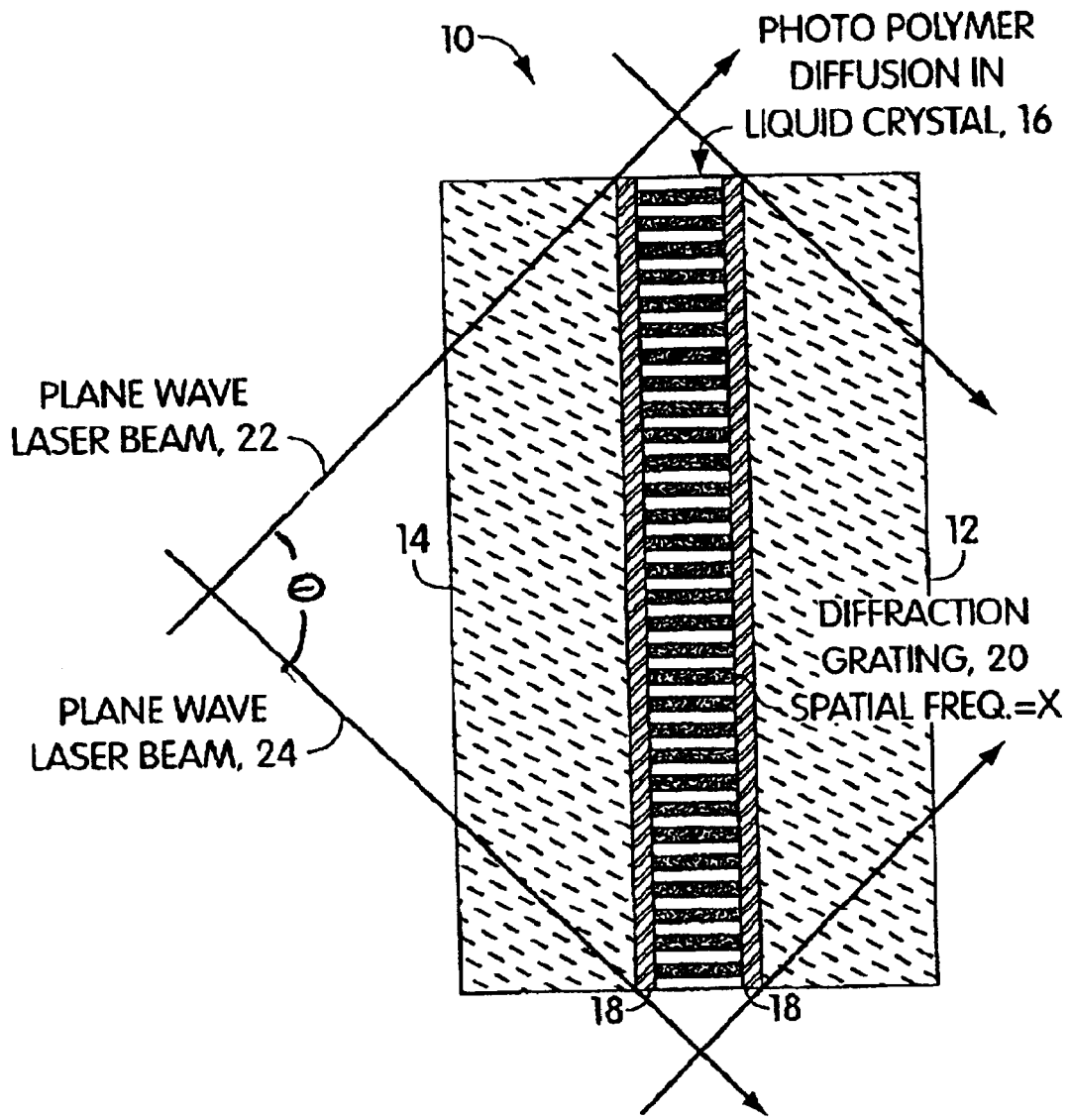
FIG. 1, is a sectional view of an optical switching cell in which a diffraction grating is formed through the utilization of interacting laser beams in a photopolymer dispersed in liquid crystal, indicating a diffraction grating of a predetermined spatial frequency.

Referring now to FIG. 1, an optical switching cell 10 is provided with opposed plates of glass or other transparent material 12 and 14 which sandwich a photopolymer dispersed in liquid crystal 16 between two transparent conductive films 18.

In one embodiment, the glasses which can be used in making these cells include glasses such as BK7, FK51, LAK6, with the particular glass having very little effect on the results of the switching.

Conductive films 18 may be any of a wide variety of transparent conducting films which serve as electrodes across which a voltage is applied to essentially erase a diffraction grating 20. Grating 20 is formed through the interaction of laser beams 22 and 24. The diffraction grating is a result of the interference pattern produced by the interaction of these beams in the photopolymer dispersed in the liquid crystal. When the photopolymer is exposed to the interference pattern it itself is patterned in a like manner so that in effect the interference pattern is embedded in the cell. In one embodiment, the thickness of the photopolymer-liquid crystal diffusion is five microns, with the wavelength of the laser beams 22 and 24 being 441.6 nm.

The angle between the two lasers depends on the desired spatial frequency of the grating which can be calculated by the formula $\tan \theta = F\lambda$, where F stands for the spatial frequency. The units are in lines per millimeter that stands for the wavelength of the laser which is in nanometers. It will be noted that the formula comes into existence when the spatial frequency is not very high.

In one embodiment the lasers used to form the diffraction grating are CW single mode lasers, with the exposure time depending upon the recording materials, namely the photopolymer. It is noted that different photosensitive materials require different exposure times as would be expected.

In one embodiment it has been found that the alignment is not critical in that the angle of the incident radiation for the input beam has a wide range, generally from plus 60 degrees to minus 60 degrees.

It will appreciated, and as described hereinafter, the angle of the input beam decides the angle of the exit beam. For purposes of discussion for the subject invention, the input beam is horizontal, thereby to describe the angles of the output beam in relation to the horizontal direction of the incident beam.

As is the usual, the diffraction property of the grating can be described by the following formula: $2d \sin \theta = m\lambda$, where $m$ is an integer and $d$ is the distance between grating lines.

Figure 2:
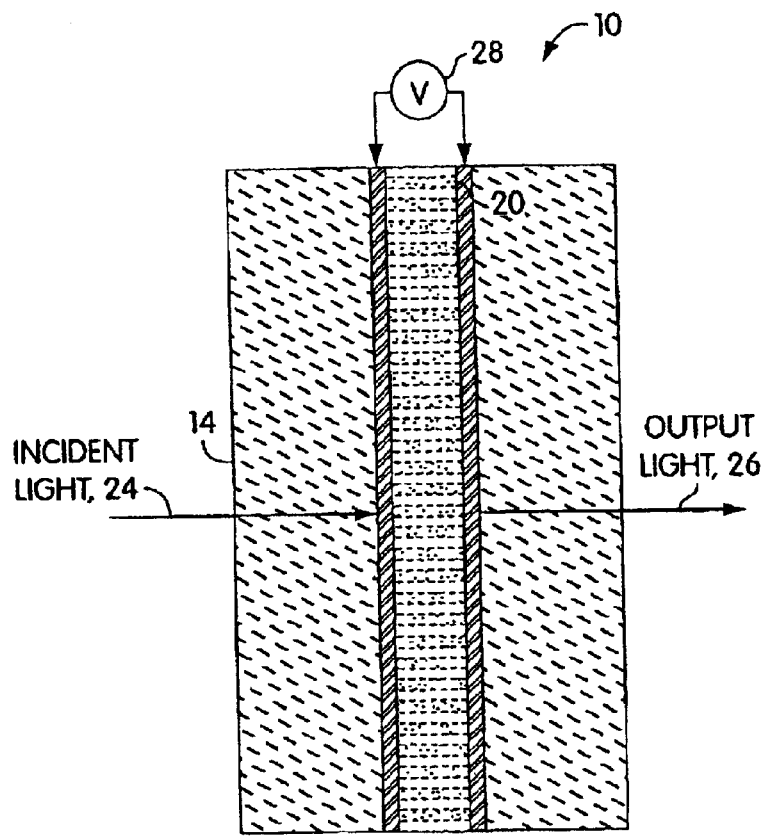
FIG. 2, is a diagrammatic illustration of the cell of FIG. 1, showing the disappearance of the diffraction grating with the application of a voltage across the conductive films which bound the photopolymer dispersed in liquid crystal of FIG. 1.
Figure 3:
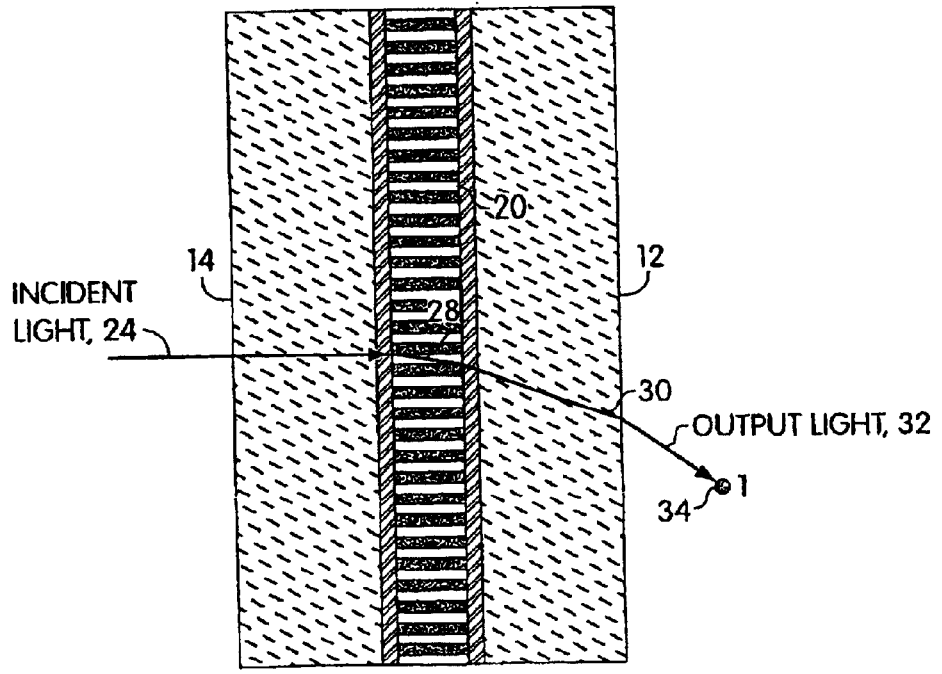
FIG. 3, is a diagrammatic illustration of the cell of FIG. 1, illustrating that for a grating of a predetermined spatial frequency incident light is diffracted to a predetermined location forming the output of the cell when the diffraction grating is in place.

It will be appreciated that the conductive films 18 may be formed from ITO which is Indium Titanium Oxide such that if an alternating current of for instance 50 hertz is utilized across the conductive films then, as shown in FIG. 2 the grating 20 effectively disappears such that that which is within the cell has no effect on incident light beam 24 as it passes through the cell and exits as output light beam 26. It will be appreciated that voltage 28 can range from 5 volts to 65 volts in one embodiment, with a switching time lower than five milliseconds to transition from a situation in which the cell has a grating to one in which the grating has disappeared. Note that the input beam is incident upon the first glass plate 14 and is shown in FIG. 3. This beam will not be refracted by the first glass plate, because the incident light is perpendicular to the face of glass plate 14.

The incident light is diffracted by grating 20 such that it exits the grating as illustrated at 28 where it enters glass plate 12 and is refracted by glass plate 12 as illustrated by beam 32 such that the output light arrives at a point 34 which is determined by the various indexes of refraction of the various components plus the spatial frequency of the grating.

The five micron layer of the photopolymer dispersed in the liquid crystal, in one embodiment is composed of a photopolymer, a liquid crystal, a dye, an acrylate oligomer and an acrylated urethane. The thickness of the grating and thus the thickness of the liquid crystal is between five microns and ten microns in one embodiment.

Compared to a mechanical optical switch, the advantages of the subject invention are fast response speed which can be lower than five milliseconds. It is much more compact and smaller in size and thus easier to be packaged. This makes it not only cost effective but the mean time to failure is quite long due to the fact of no moving parts in the optical switch.

Moreover, it is easy to provide an M×N matrix optical switch with exceptionally low power consumption, the power needing to be applied only when the grating is to be erased.

With respect to improvements over the aforementioned U.S. Pat. No. 6,111,633, adjustment tolerances are nowhere near as critical and there are lower insertion losses associated with the subject optical switch.

It will be appreciated that the subject optical switch can be widely used in telecommunications which it can improve the transmission speed effectively.

Note that generating the holographic or interference grating with high resolution and high diffraction efficiency plays a very important role in the making of the subject optical switch. As mentioned above, the grating is recorded in the photopolymer dispersed liquid crystal which is positioned between two ITO coded glass plates.

Figure 4:
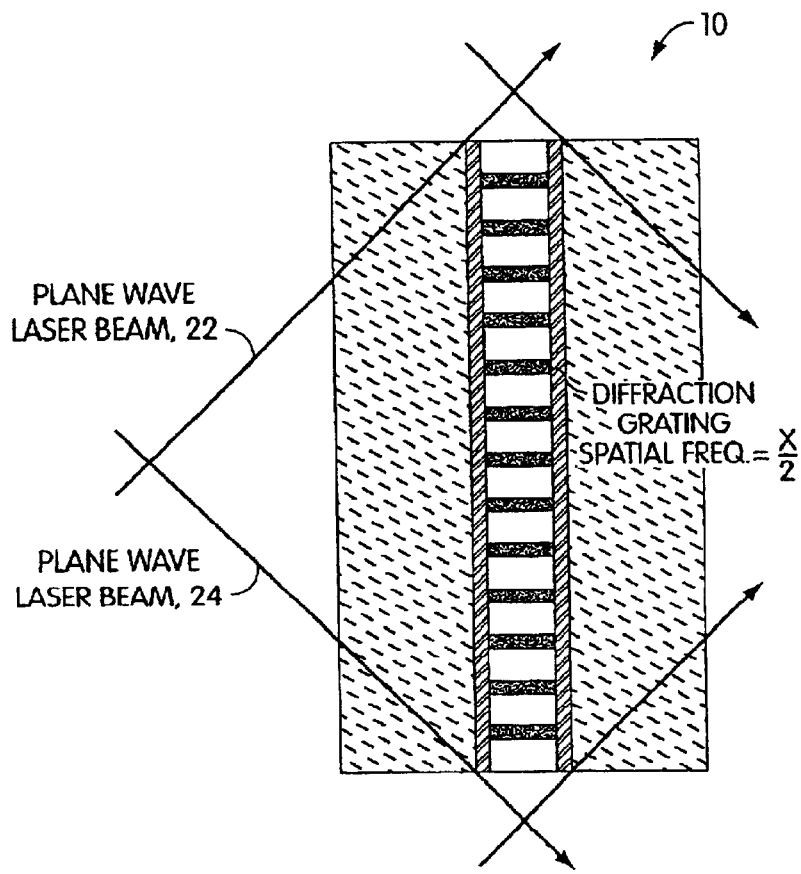
FIG. 4, is a diagrammatic illustration of the cell of FIG. 1, with a diffraction grating having a spatial frequency which is one half that of the grating in FIG. 1.
Figure 5:
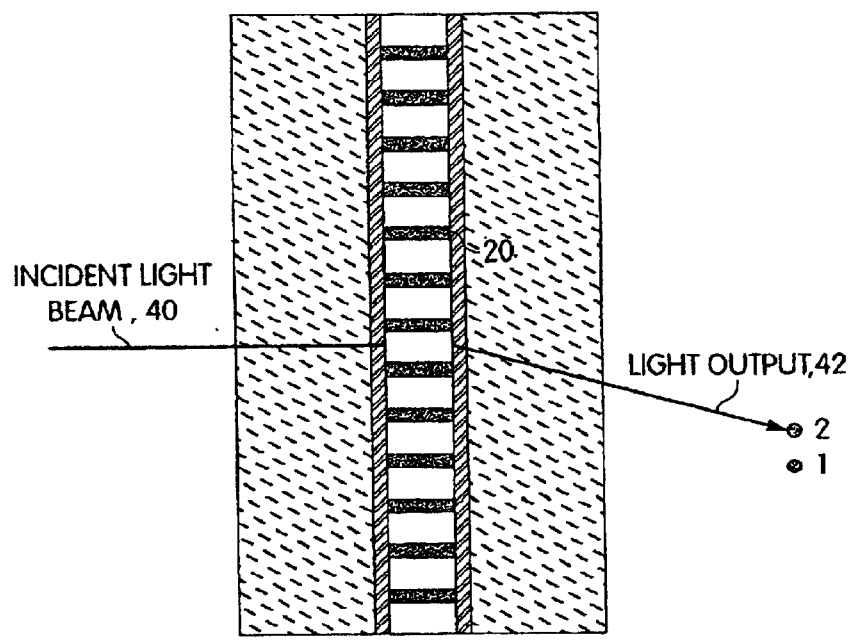
FIG. 5, is a diagrammatic illustration of the cell of FIG. 4, in which the incident light beam is diffracted to a second point spaced upwardly from the first point associated with the diffraction grating of FIG. 1.

Referring now to FIG. 4, it will be appreciated that cell 10 can be provided with diffraction gratings of differing spatial frequencies by controlling the angle of laser beam 22 and laser beam 24. As shown, diffraction grating 20' has a spatial frequency one half that associated with FIG. 1. As a result, and referring now to FIG. 5, an incident light beam 40 is diffracted by grating 20' so that rather than exiting the cell to a position 1, light output beam 42 exits the cell above that associated with the higher spatial frequency grating. In this manner, the exit point of the output light is controlled to a large extent by the spatial frequency of the grating in the photopolymer dispersed liquid crystal.

This is useful in being able to control the exit point of an incident light beam such that when the cells are cascaded, by turning on and off the cells in a particular pattern, the light can be made to exit at various points, thus conveying different information depending on the point at which the light beam exits.

Figure 6:
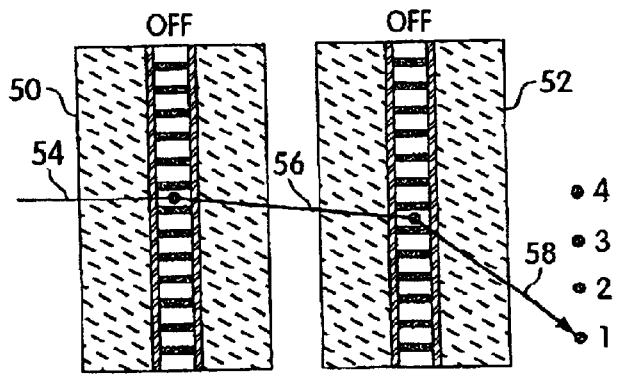
FIG. 6, is a diagrammatic illustration of cascaded cells in which the voltage is off for each of the cells causing the incoming light beam to be doubly diffracted to a position 1.

This is illustrated in FIG. 6, in which two cascaded cells 50 and 52 are arranged side by side. In this case, incident light beam 54 is diffracted by the grating in cell 50 such that it exits the cell as illustrated by beam 56 and impinges upon cell 52. Cell 52 having a grating of a predetermined spatial frequency then diffracts beam 56 as illustrated in 58 so that with no voltage applied to either of the two cells the light exits at a point 1.

Figure 7:
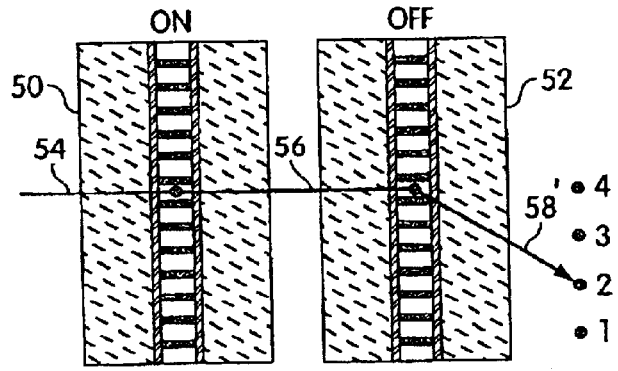
FIG. 7, is a diagrammatic illustration of the cascaded cells of FIG. 6, in which the first cell has a voltage applied thereto, with a second cell having no voltage, thus providing the incoming beam with a transparent cell followed by one with a diffraction grating so as to diffract the incoming light beam to a position 2.

Referring now to FIG. 7, with cell 50 having a voltage applied thereto and with cell 52 having no voltage applied, cell 50 is said to be on and cell 52 is said to be off. With the voltage applied to cell 50, light beam 54 is not diffracted at all by cell 50, but is rather diffracted by the grating of cell 52, such that the exit beam 58' now is diffracted to a point 2 which is above point 1.

Figure 8:
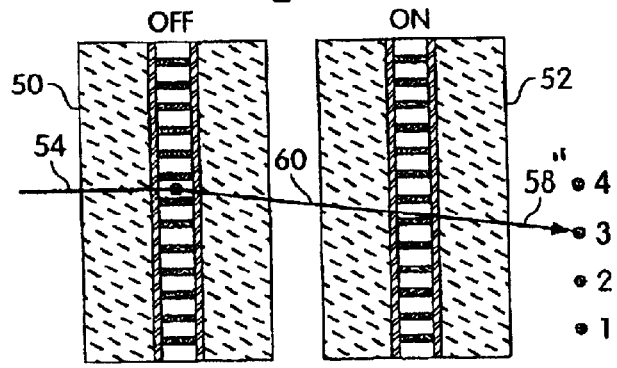
FIG. 8, is a diagrammatic illustration of the cascaded cells of FIG. 6, in which the first cell is off in which no voltage is applied, whereas the second cell has a voltage applied, thus illustrating the diffraction of the incoming beam by the first cell followed by no diffraction for the second cell so as to diffract the incoming light beam to a position 3.

On the other hand, referring now to FIG. 8, with cell 50 off and cell 52 on, assuming that the cells have differing spatial frequency gratings, then beam 54 is diffracted as seen at 58" in accordance with the diffraction grating of cell 50, whereas cell 52 does not alter the path of the light beam 60 as it emerges from cell 50. The result is that the beam is deflected or is diffracted to point 3 which is above points 1 and 2.

Figure 9:
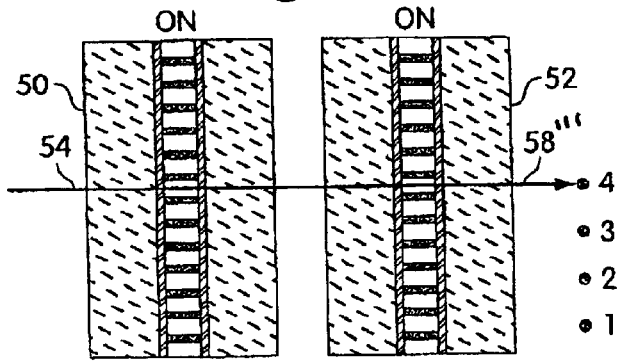
FIG. 9, is a diagrammatic illustration of the cascaded cells of FIG. 6, in which voltage is applied to both of the cells such that no diffraction occurs, illustrating that the input beam is available at a position 4.

Referring finally now to FIG. 9, with cells 50 and 52 on, meaning a voltage is applied to erase the gratings thereof, input light beam 54 is not diffracted at all and exits at 58''' to a point 4 which is above the previously mentioned points 1, 2 and 3.

What will be seen is that by cascading cells having different frequency gratings, the light beam that initially impinges upon the first cell can be diffracted to one of four different positions depending on the status of the voltage across each of the cells.

What this means is that in a cascading approach, the system is no longer binary meaning that the light either is emitted at one point or another point. In the cascaded system multiple points can be selected and depends on the number of cascaded cells and the spatial frequency of the gratings of each of the cells.

What has therefore been provided is an optical switch involving no polarized light but rather the utilization of a photopolymer dispersed in liquid crystal which when appropriately patterned by interacting laser beams provides an erasable grating, with the grating being erasable for the application of a voltage there across.

Not only are all of the aforementioned advantages applicable to the cascaded case, it is apparent that the versatility of such cascaded switches result in the ability to control the diffraction of light through the cells so as to have it arrive at one of a number of different exit locations depending upon which of the cells a voltage is applied to.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. A polarization independent optical switch, comprising:
   two spaced apart transparent plates, said plates having conductors thereat;
   a liquid crystal layer sandwiched between said two plates and having a photopolymer dispersed therein;
   a diffraction grating formed within said liquid crystal layer and having a predetermined spatial frequency; and,
   a voltage selectively applied across said plates to erase said grating such that an impinging light beam either passes through said switch having its exit direction offset in accordance with the spatial frequency of said grating so as to exit at a predetermined exit point or has its exit direction unaltered by said switch such that said light beam exits at a different exit point, thus to switch said incoming beam between two exit points.

2. The optical switch of claim 1, wherein each set of plates constitutes a cell, and further including means for mounting said cells together such that said light beam passes through each of said cells, the exit point of said beam determined by which of said cells has said voltage applied there across.

3. The optical switch of claim 2, wherein one cell has a liquid crystal layer with a diffraction grating having a spatial frequency different from that of another of said cells thus to be able to vary the exit point associated with the diffraction grating of a cell to further control the exit point of said impinging beam.

4. The optical switch of claim 1, wherein said impinging beam is a monochromatic light beam.

5. The optical switch of claim 4, wherein said beam is plane polarized.

6. The optical switch of claim 5, wherein said grating is formed by two interacting laser beams.

7. The optical switch of claim 6, wherein said interacting laser beams are plane polarized.

* * * * *